United States Patent [19]

Cassese

[11] Patent Number: 4,811,812
[45] Date of Patent: Mar. 14, 1989

[54] REAR FRAME FORMING PART OF A SUPPORTING STRUCTURE OF A MOTOR VEHICLE

[75] Inventor: Ferdinando Cassese, Modena, Italy

[73] Assignee: Ferrari Engineering S.p.A., Modena, Italy

[21] Appl. No.: 207,203

[22] Filed: Jun. 16, 1988

[30] Foreign Application Priority Data

Jun. 16, 1987 [IT] Italy ............................... 67511 A/87

[51] Int. Cl.⁴ ............................................. B60K 5/04
[52] U.S. Cl. ................................ 180/295; 180/299; 180/312; 280/788
[58] Field of Search ............... 280/781, 788; 180/312, 180/295, 299

[56] References Cited

U.S. PATENT DOCUMENTS

| | | | |
|---|---|---|---|
| 2,817,557 | 12/1957 | Reynolds | 180/312 |
| 4,093,255 | 6/1978 | Wilfert et al. | 280/788 |
| 4,240,517 | 12/1980 | Harlow, Jr. et al. | 180/295 |
| 4,723,791 | 2/1988 | Miyra et al. | 180/312 |

FOREIGN PATENT DOCUMENTS 1096216 12/1960 Fed. Rep. of Germany ...... 180/299

Primary Examiner—Kenneth R. Rice
Attorney, Agent, or Firm—Shlesinger, Arkwright & Garvey

[57] ABSTRACT

The rear frame is resiliently connected to a central frame of the support structure and is adapted to support the engine and some of the members of the transmission and is resiliently connected to each rear wheel of the motor vehicle; this frame substantially comprises a pair of first ring-shape structural elements each of which is adapted to support a resilient suspension and comprises a plurality of limbs connected together; the frame further includes a plurality of cross members connecting together the ring-shape structural elements to form with them a single lattice structure, as well as two pairs of longitudinal side members each of which has one end fixed to one of the ring-shape structural elements and the other end adapted to be connected resiliently to the central frame.

7 Claims, 6 Drawing Sheets

REAR FRAME FORMING PART OF A SUPPORTING STRUCTURE OF A MOTOR VEHICLE

BACKGROUND OF THE INVENTION

The present invention relates to a rear frame forming part of a supporting structure of a motor vehicle which is resiliently connected to a central frame of the structure itself to support the engine and some of the transmission members of the motor vehicle, as well as being resiliently connected to each rear wheel of the motor vehicle itself through a resilient suspension.

A supporting structure of this type is described in the Patent application by the same applicant filed on the same date and entitled "A motor vehicle supporting structure".

The rear frame of the present invention is particularly adapted to be utilised in the above mentioned supporting structure.

This substantially comprises a central frame defining the motor vehicle passenger compartment, a front frame connected by first resilient connection means to the front part of the central frame and provided with first attachment means for the front suspension, and a rear frame, connected by second resilient connection means to the rear part of the central frame and provided with second attachment means for the rear suspension; the rear frame supports the motor vehicle engine and some of the transmission members, whilst the front frame supports the other transmission members.

SUMMARY OF THE INVENTION

The object of the present invention is that of providing a rear frame for this structure which will have a very high mechanical strength such as to resist the stresses which are transmitted to it by the wheels of the motor vehicle during motion of this, and a high rigidity such as to prevent any deformation of the frame itself under any operating conditions of the motor vehicle. Another object of the invention is that of providing a frame of this type which will have a very reduced weight and dimensions.

These objects are achieved by a rear frame forming part of a motor vehicle supporting structure and resiliently connected to a central frame of the said structure for supporting the motor vehicle passenger compartment, the said rear frame being adapted to support the engine and some of the members of the motor vehicle transmission and being connected resiliently to each rear wheel of the motor vehicle via a resilient suspension, characterised by the fact that it comprises a pair of first ring-shape structural elements each of which is substantially disposed in a plane parallel to the direction of motion of the said motor vehicle and is adapted to support one of the said resilient suspensions and includes, in turn, a plurality of limbs connected together at their ends in such a way as to form a closed polygonal lattice; a plurality of cross members orthogonal to the said direction and adapted to connect the said ring-shape structural elements to form with these a single lattice structure; two pairs of longitudinal side members each of which has one end fixed to one of the said rings-shape structural elements and the other end adapted to be connected resiliently to the said central frame, one of the said longitudinal side members of each pair delimiting the top of the said rear frame at one side and the other longitudinal side member delimiting the bottom of the said frame at that side.

BRIEF DESCRIPTION OF THE DRAWINGS

For a better understanding of the frame structure of the invention a more detailed description of it will now be given by way of example with reference to the attached drawings, in which.

DETAILED DESCRIPTION OF THE INVENTION

Figure 1:
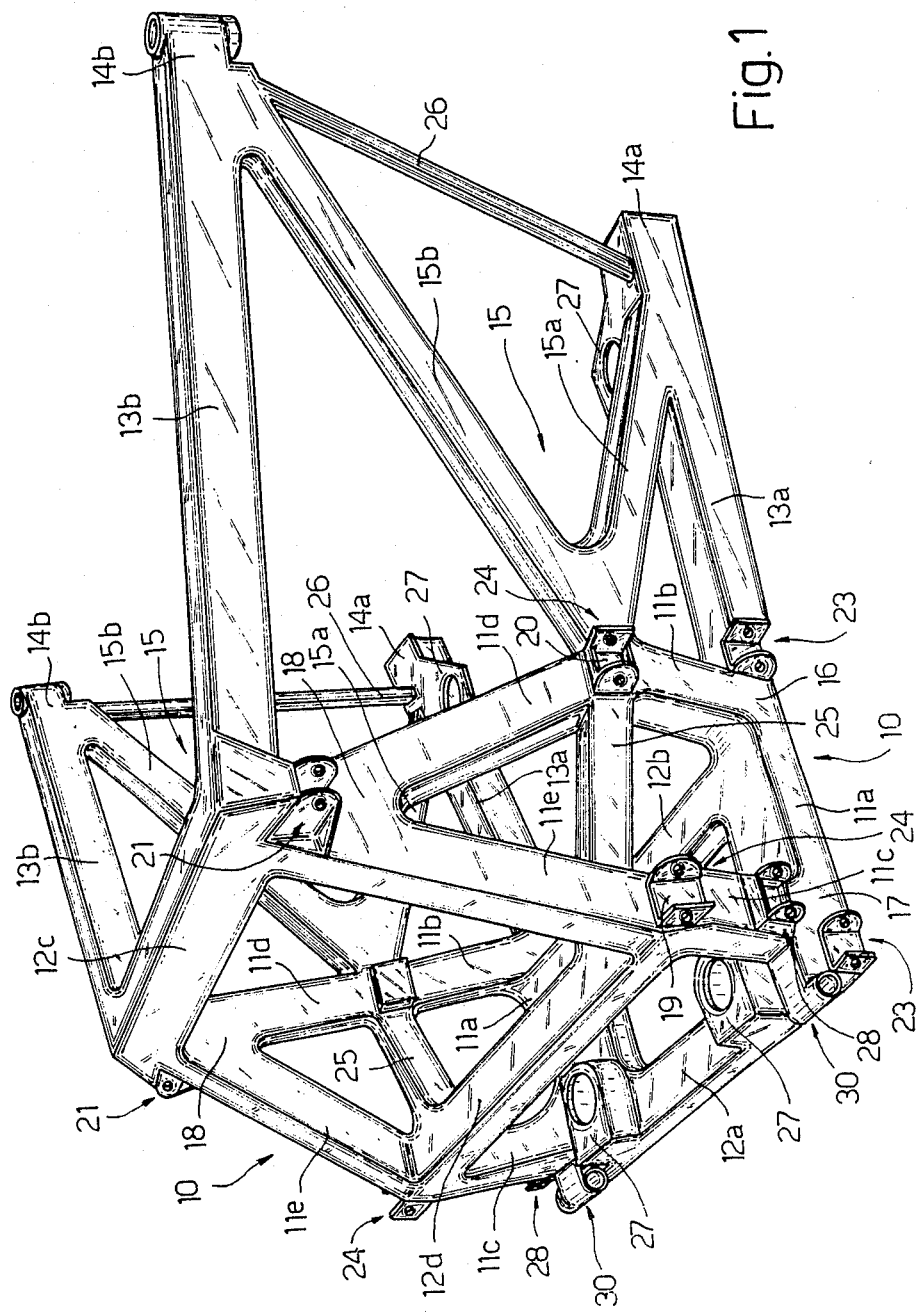
FIG. 1 is a perspective view from the rear side of the frame of the invention.
Figure 2:
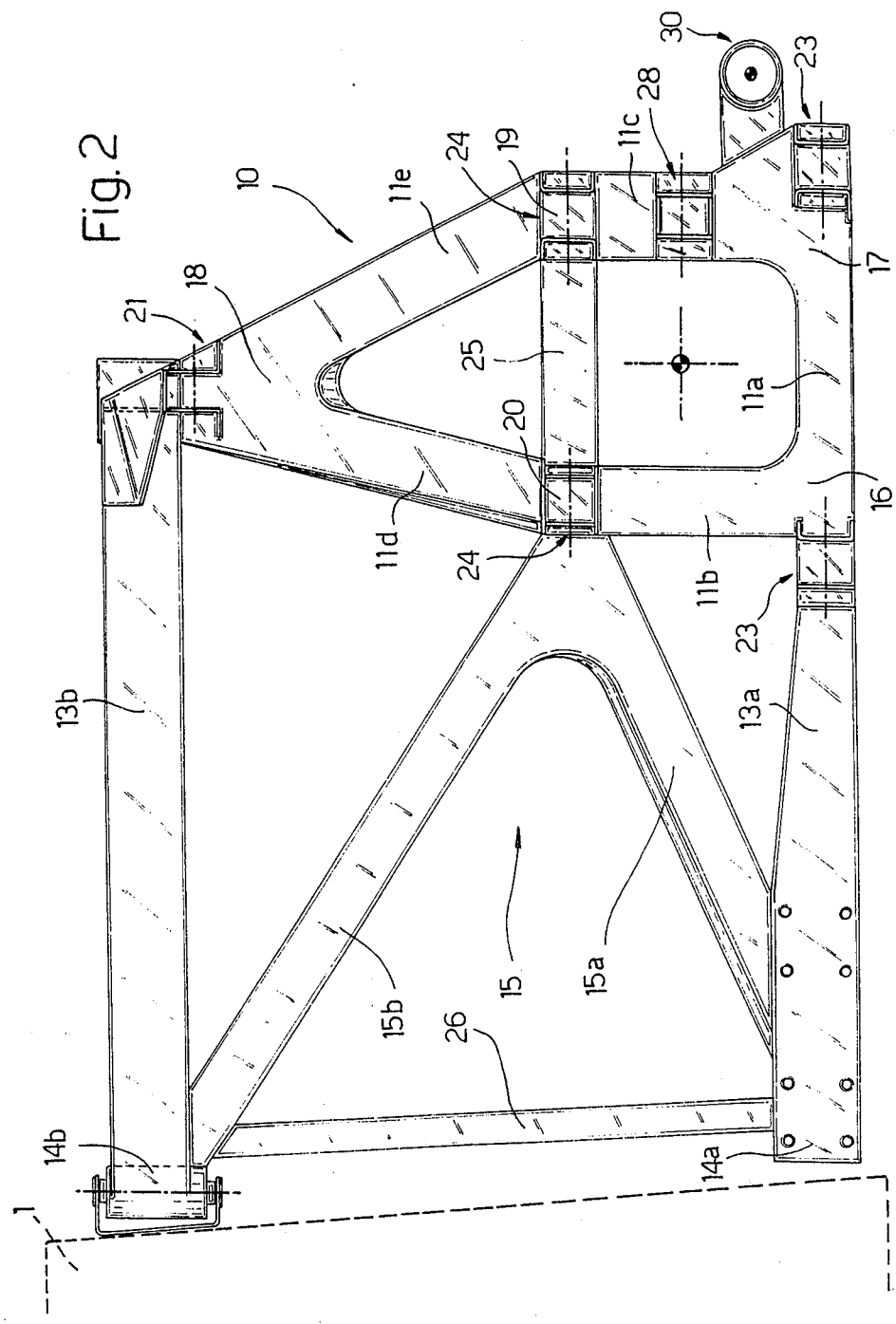
FIG. 2 is a side view of the frame of the invention.

The rear frame of the invention shown in FIGS. 1 and 2 forms part of a supporting structure for a motor vehicle (not shown) and is resiliently connected to a central frame 1 (FIG. 2) which forms part of this structure and which supports the motor vehicle passenger compartment; the manner of connection of the rear frame to the central frame is described in the patent application mentioned above.

Figure 4:
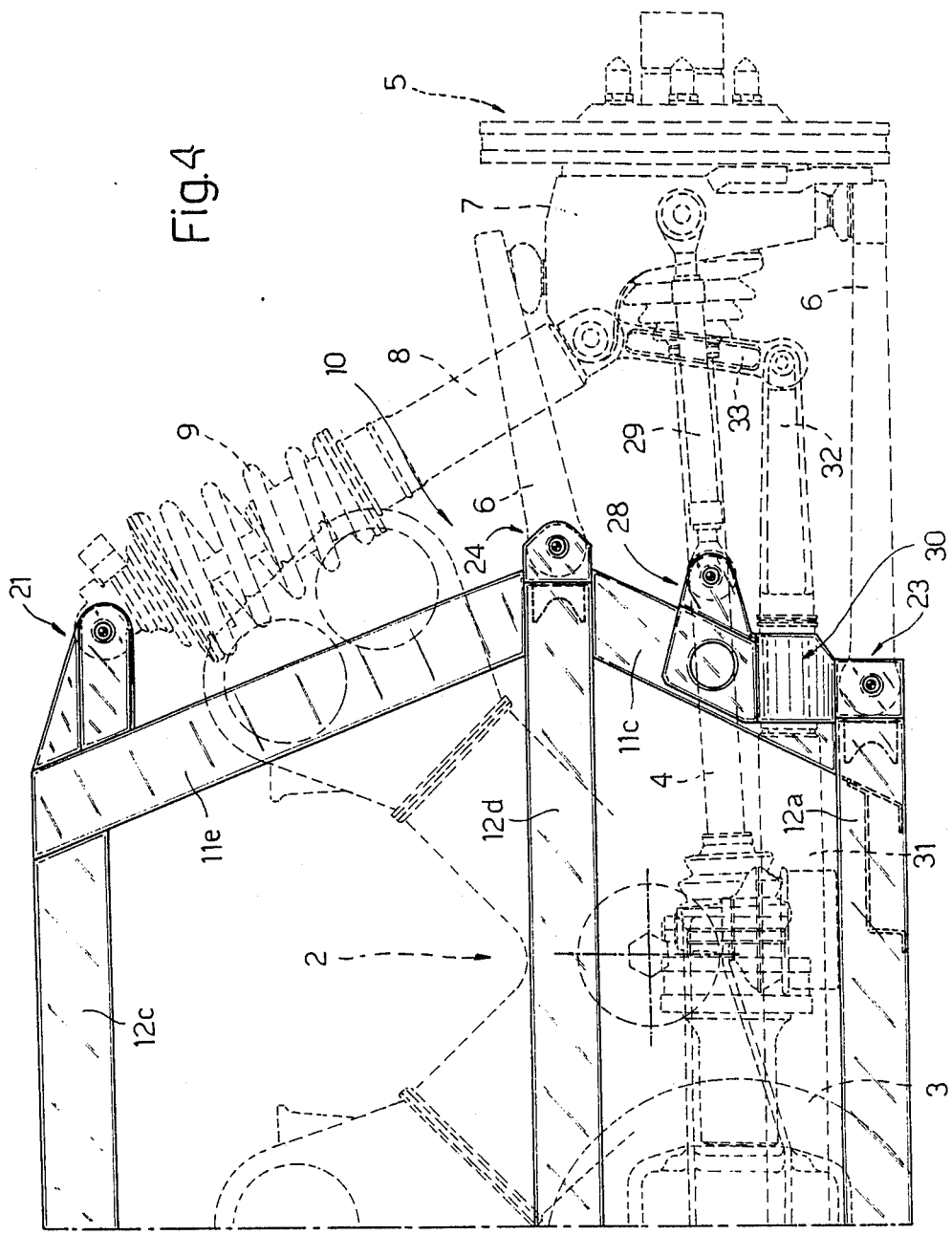
FIG. 4 is a rear view of half of the frame of the invention in which there have also been shown, in broken outline, those members connected to the frame itself.
Figure 5:
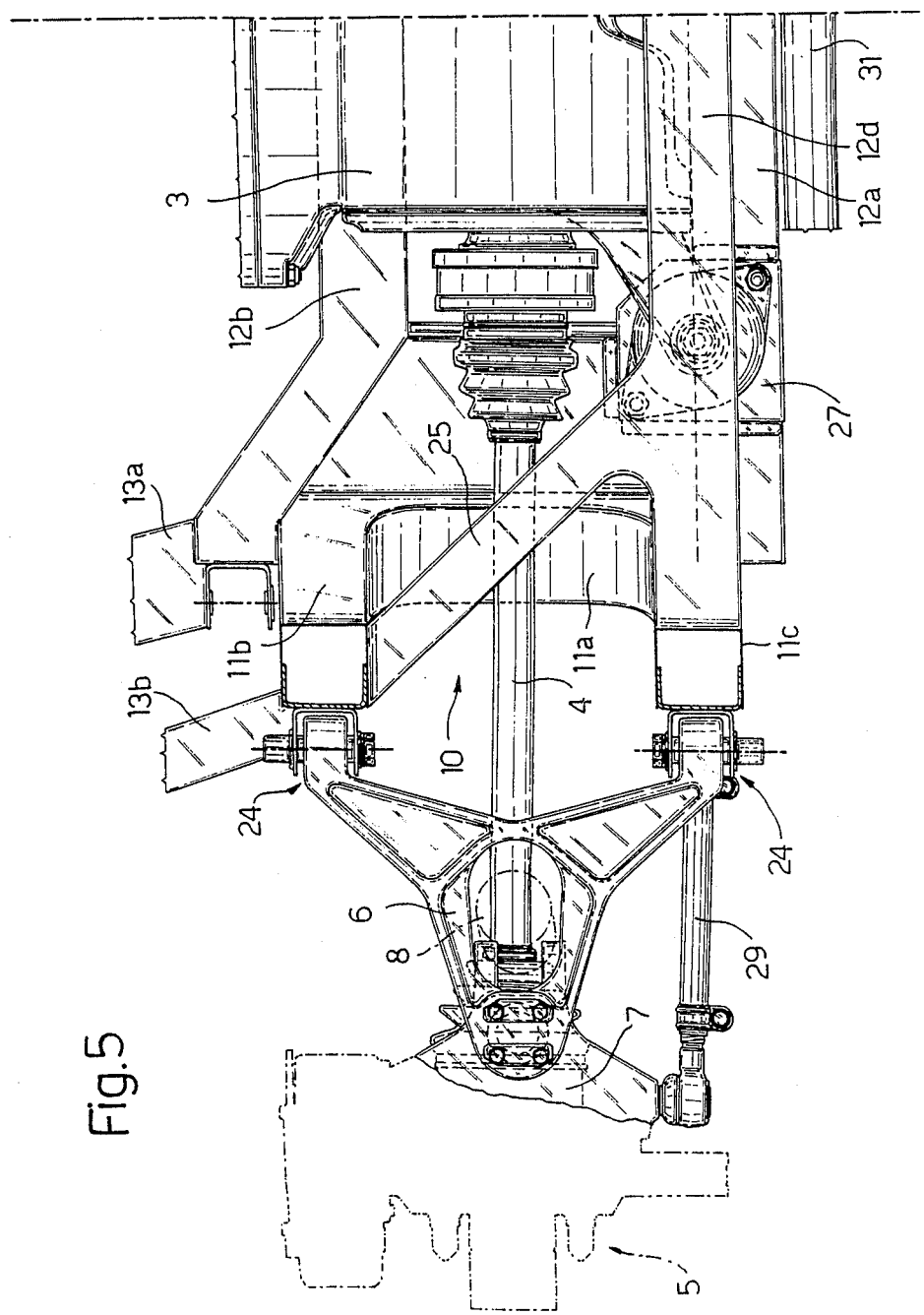
FIG. 5 is a plan view of half of the frame of th invention in which some parts have been omitted for simplicity.

The frame of the invention is adapted to support the engine 2 (FIG. 4) and some of the transmission members such as the gear box - rear differential unit 3 and the half shafts 4 which transmit drive from this unit to the wheels 5; this frame is then resiliently connected to each of these wheels through a resilient articulated quadrilaterl suspension comprising substantially one pair of pivoted arms 6, a wheel mounting 7, a shock absorber 8, a coil spring 9 and other members not shown.

The rear frame of the invention substantially comprises a pair of first ring-shape structural elements 10 (FIG. 1) each of which is substantially disposed in a plane parallel to the direction of movement of the motor vehicle and is adapted to support one of the suspensions and comprises, in turn, a plurality of limbs 11a, 11b, 11c, 11d and 11e connected together at their ends in such a way as to form a substantially closed polygonal lattice. The frame further comprises a plurality of cross members 12a, 12b, 12c, 12d orthogonal to the said direction and connecting together the two ring-shape structural elements 10 in such a way as to form with these a single lattice structure which can be seen in FIG. 1.

Figure 3:
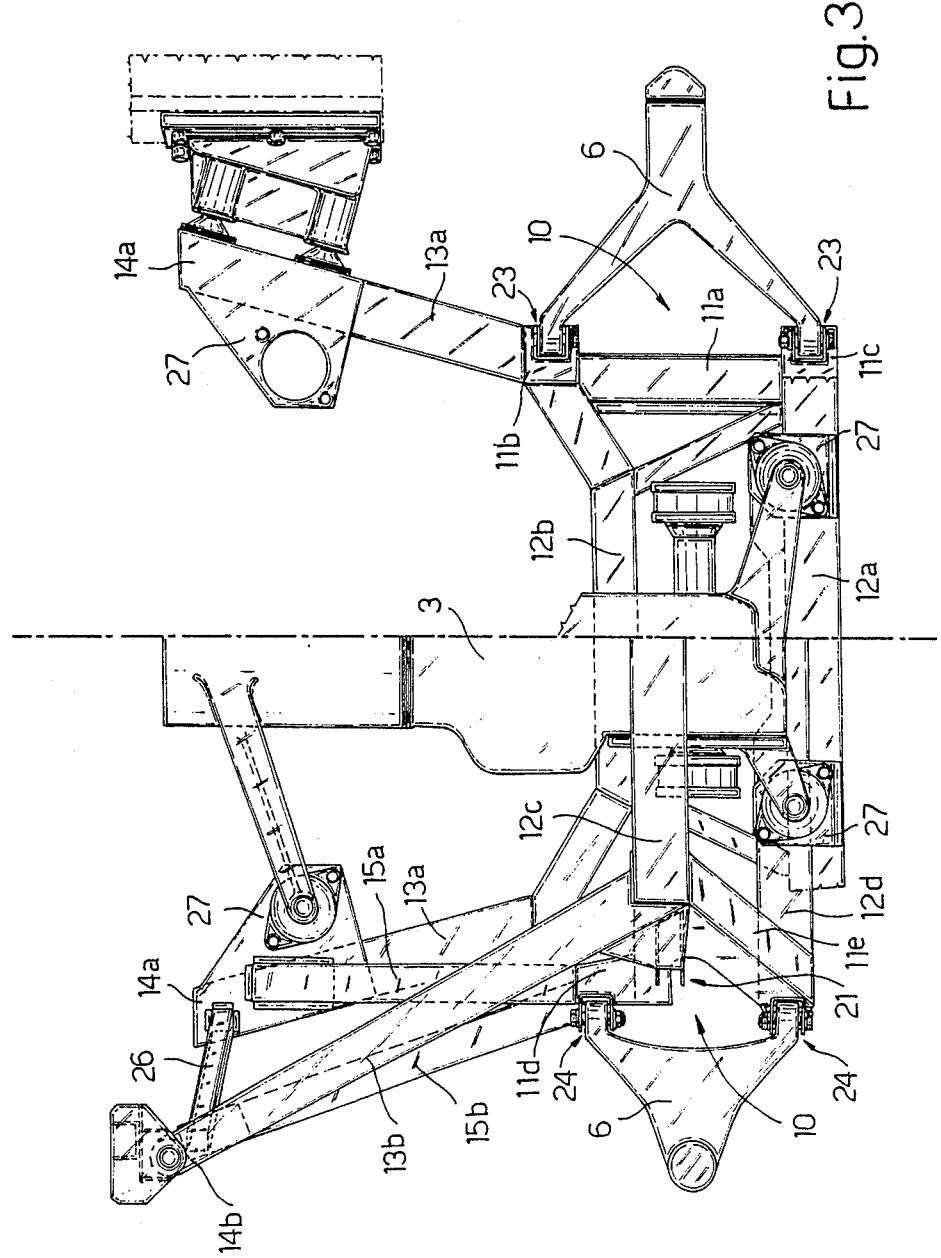
FIG. 3 is a plan view from above of one half of the frame from which some parts have been omitted in order to show those disposed in the lower part thereof.

Also forming part of the frame are two longitudinal side members 13a, 13b each of which has one end fixed to one of the structural elements 10 and the other end 14a, 15b, respectively, adapted to be resiliently connected to the central frame. As is clearly seen in FIG. 1, one of the longitudinal side members 13b of each pair of longitudinal side members delimits the top of one side of the frame, whilst the other longitudinal side member 13aof the same pair delimits the bottom of the same side of the frame. As is clearly seen from FIGS. 1 and 3 the two upper longitudinal side members 13b of the frame and the two lower longitudinal side members 13a are disposed with their axes diverging towards the central frame. Between the two longitudinal side members 13a and 13b of each pair there is disposed a second structural element 15 comprising two limbs 15a, 15b which are disposed in such a way as to form a V and are connected together at the vertex; this latter zone is fixed to one of the ring-shape structural elements 10, whilst the free ends of the limbs 15a and 15b are fixed substantially in correspondence with the ends 14a, 14b of the longitudinal side members 13a and 13b.

Each of the ring shape structural elements 10 conveniently includes a first series of three limbs 11a, 11b, 11c which are disposed in such a way as to form a U and which, in correspondence with their intersections, form nodes 16 and 17; a second series of two limbs, indicated 11d and 11e, which are disposed in such a way as to form a V and, in correspondence with their intersection, form a node 18. The limbs of the two said series are disposed in two different planes forming a predetermined dihedral angle between them which can be seen in FIG. 1 and in FIG. 4; the limbs of these two series are connected in such a way that the end of a limb of the first series is connected to the end of a corresponding limb of the second series to define nodes 19 and 20.

The lower pivoted arm 6 of the suspension is pivoted by means of a pair of brackets 23 (FIG. 1) to the nodes 16 and 17, whilst the upper pivoted arm is pivoted by other brackets 24 to the nodes 19 and 20. Finally the upper end of the shock absorber 8 is pivoted to the node 18 by means of a bracket 21.

As is clearly seen from FIG. 1 the cross members 12a and 12b are connected to the ring-shape structural elements 10 at respective nodes 17 and 16 of these elements, the cross member 12d is connected to the nodes 19 and the cross member 12c is connected substantially at the nodes 18 of these elements.

The lattice structure formed by the ring-shape structural elements 10 and by the cross members 12a, b, c and d again include a pair of limbs 25 each of which connects a node 20 with a zone of the cross member 12d.

Finally, the frame includes a pair of further limbs 26 each of which connects together the ends 14a and 14b of the longitudinal side members 13a, 13b as is clearly seen in FIG. 1.

On the cross member 12a there are disposed two mounts 27 to allow connection of the engine 2, whilst another two mounts 27 intended for the same purpose are each fixed to one longitudinal side member 13a.

Figure 6:
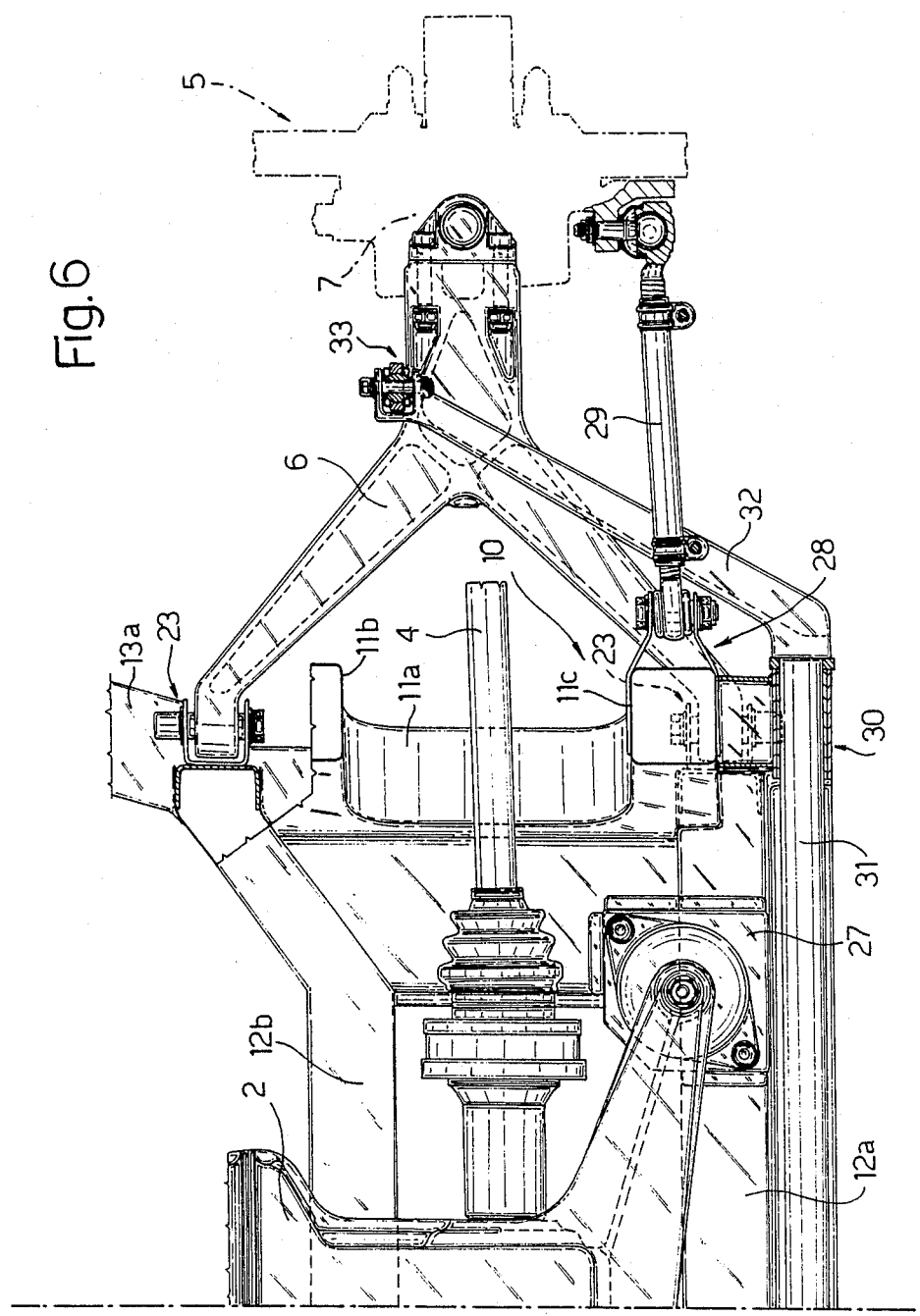
FIG. 6 is another plan view of the other half of the frame in which several parts have been omitted for simplicity.

Conveniently each limb 11c has a bracket 28 fixed thereto to allow pivoting of a link 29 (FIG. 4) in turn pivoted to the mount 9 of the wheel 5. A pair of sleeves 30 (FIG. 1) having axes orthogonal to the longitudinal axis of the supporting structure are fixed to the cross piece 12a to form seats for a transverse bar 31 (FIG. 6), each end of which is connected by means of a crank 32 (FIGS. 4 and 6) and a link 33 to a suitable region of the mount 7 of the wheel 5; this transverse stabilising bar, as is known, serves mechanically to connect the two suspensions.

All the limbs forming part of the structure of the frame of the invention are conveniently made from steel sections having a rectangular cross section or other form and these limbs are connected together by welding.

The rear frame of the invention, whilst being of very low weight and bulk, has a very high mechanical strength and rigidity. These favourable characteristics derive from its structure: the high stresses which are transmitted from the wheels to the suspension and from this to the frame are supported by the ring-shape structural elements 10 which, having a closed form and being constituted by short limbs connected together at their ends, is very robust and very rigid; the connection of the arms 6 and the shock absorber 8 of the suspension is effected in correspondence with the nodes 16, 17, 18, 19, 20 of each of the structural elements 10, that is to say in the zones in which the element itself has a high strength. Moreover, the two structural elements 10 are connected together by four cross members 12a, b, c and d which form with these a lattice structure having a very high strength and rigidity; the dihedral configuration of each structural element 10 also contributes to these favourable characteristics: in fact, the three limbs 11a, 11b and 11c lie in a different plane from that in which the limbs 11e and 11d lie; finally, the limbs 25 which connect the nodes 20 to the cross member 12d further reinforce the lattice structure. The spatial lattice structure thus obtained has a high rigidity, both flexural and torsional, such as to be practically indeformable under the action of the forces and moments which are applied to it during movement of the vehicle. Therefore the initial geometric conditions to which the suspensions are set are maintained substantially unchanged in any operating conditions and for the whole of the working life of the vehicle. The assembly constituted by the longitudinal side members 13a, 13b and the V-shape structural elements 15 allows the connection of the spatial lattic structure mentioned above to the central frame without interfering with the engine and the other members of the transmission for housing which a space of very large dimensions remains available within the interior of the frame.

It is evident that the form and arrangement of the various parts of the rear frame structure which has been described can have modifications and variations introduced thereto withouth departing from the scope of the invention.

I claim:

1. A rear frame forming part of a supporting structure of a motor vehicle and resiliently connected to a central frame (1) of the said structure, which is adapted to support the motor vehicle passenger compartment, the said rear frame being adapted to support the engine (2) and some of the members (3, 4) of the motor vehicle transmission and being resiliently connected to each rear wheel (5) of the motor vehicle via a resilient suspension, characterised by the fact that it includes a pair of first ring-shape structural elements (10) each of which is disposed substantially in a plane parallel to the direction of movement of the said motor vehicle and is adapted to support one of the said resilient suspensions and in turn comprises a plurality of limbs (11a, b, c, d, e) connected together at their ends in such a way as to form a closed polygonal lattice, a plurality of cross members (12a, b, c, d) orthogonal to the said direction and connecting together the said ring-shape structural elements to form with them a single lattice structure; two pairs of longitudinal side members (13a, 13b) each of which has one end fixed to one of the said ring-shape structural elements and the other end (14a, 14b) adapted to be resiliently connected to the said central frame, one of the said longitudinal side members of each pair delimiting the top of one side of the said frame and the other longitudinal side member delimiting the bottom of the same side of the frame.

2. A rear frame according to claim 1, characterised by the fact that the two longitudinal side members (13b) which delimit the top of the rear frame and the two longitudinal side members (13a) which delimit the bottom of the frame itself are disposed with their axes diverging towards the said central frame.

3. A rear frame according to claim 1 characterised by the fact that between the said longitudinal side members of each pair there is disposed a second structural element (19) comprising two limbs (15a, 15b) disposed in a V and connected together in the region of the vertex, the said vertex region of each of the said second structural elements being fixed to one of the said first structural elements (10) and the free end of each of the said limbs of the element itself being fixed to a corresponding end of one of the said longitudinal side members (13a, 13b).

4. A rear frame according to claim 1, in which the said resilient suspension comprises at least one pair of pivoted arms (6) to which the wheel mounting member (7) is pivoted and at least one shock absorber (8) and a coil spring (9), characterised by the fact that each of the said first ring-shape structural elements (10) comprises a series of three limbs (11a, b, c) disposed in a U to form a first node (16) and a second node (17) at their intersections, a second series of two limbs (11d, e) disposed in a V which form at their intersections a third node (18), the limbs of the said two series being disposed in two different planes forming a predetermined dihedral angle to one another, and being connected together in such a way that the end of a limb of the first series is connected to the end of a corresponding limb of the second series to form a fourth node (19) and a fifth node (20), one of the said pivoted arms being pivoted by means of a first pair of pivots (23) to the said first node (16) and the second node (17), and the other pivoted arm being pivoted by means of a second pair of pivots (24) to the said fourth node (19) and the said fifth node (20), and the said shock absorber being pivoted to the said third node (18).

5. A rear frame according to claim 1, characterised by the fact that the said lattice structure includes a pair of lower cross members (12a, b) one of which has its ends connected to the said first nodes (16) and the other of which has its ends connected to the said second nodes (17), an intermediate cross member (12d) the ends of which are connected to the said fourth nodes (19) and an upper cross member (12c) the ends of which are connected to the said third nodes (18), the said lattice structure further including a pair of limbs (25) each of which connects the said fifth node (20) to a region of the said intermediate cross member.

6. A rear frame according to claim 1, characterised by the fact that it includes a further pair of limbs (26) each of which connects together the said free ends (14a, b) of the said longitudinal side members (13a, b) of each pair thereof.

7. A rear frame according to claim 1, characterised by the fact that one of the said lower cross members and the said longitudinal side member which delimits the bottom of the frame are provided with mounts (27) for the said engine and for the said transmission members.

* * * * *